United States Patent [19]

Baba

[11] 3,993,169
[45] Nov. 23, 1976

[54] LOCKING DEVICE
[75] Inventor: Masanao Baba, Takarazuka, Japan
[73] Assignee: Nippon Cable System Inc., Japan
[22] Filed: Nov. 20, 1975
[21] Appl. No.: 633,698

[30] Foreign Application Priority Data
May 20, 1975 Japan................................. 50-60496
July 3, 1975 Japan................................. 50-82482

[52] U.S. Cl.................................... 188/67; 74/531; 403/104
[51] Int. Cl.² ......................................... F16D 63/00
[58] Field of Search........................ 188/67; 74/531; 248/295, 298, 354 R, 354 C; 403/104

[56] References Cited
UNITED STATES PATENTS
2,173,255  9/1939  Jandus .................................. 74/531
3,866,720  2/1975  Wallerstein, Jr. ..................... 188/67

FOREIGN PATENTS OR APPLICATIONS
751,984  7/1933  France ................................. 74/531
856,385  3/1940  France ................................. 188/67

Primary Examiner—George E. A. Halvosa
Attorney, Agent, or Firm—Armstrong, Nikaido & Wegner

[57] ABSTRACT

A locking device adapted to lock a driven member automatically against the force which applies thereon comprising a locking plate which has an arbitrary length and locking flanks on both sides thereof; a locking member which has contact members with which locking flanks of the locking plate contact and pins; a drive plate which has contact sides, formed at about right angles to the longitudinal axis of the locking plate, with which the pins are in contact and a drive member thereon; and an operating plate which has a first sliding flank approximately paralleled to the longitudinal axis of the locking plate, along which one of pins of the locking member slides and a second sliding flank inclined to the first sliding flank along which another pin of the locking member slides. The contact members are generally pressed against the locking flanks of the locking plate by a suitable resilient.

7 Claims, 13 Drawing Figures

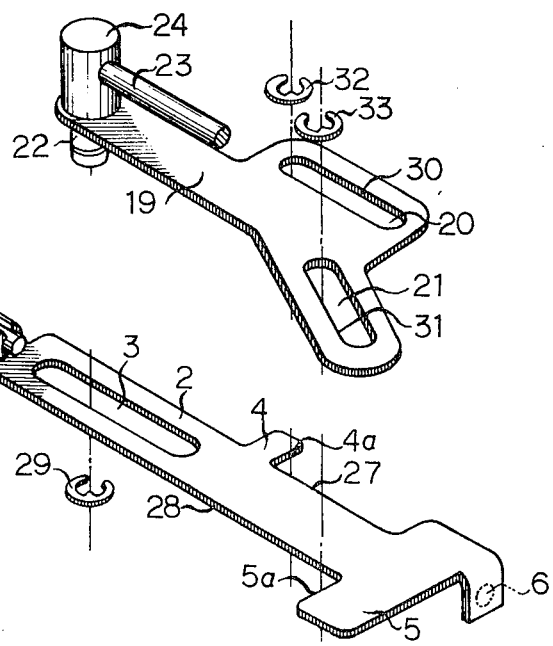
FIG.3A
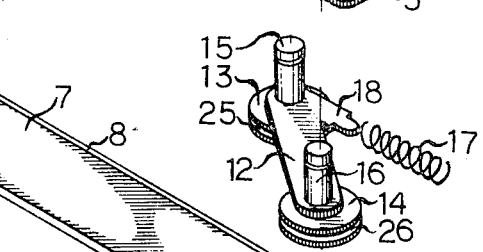
FIG.3B
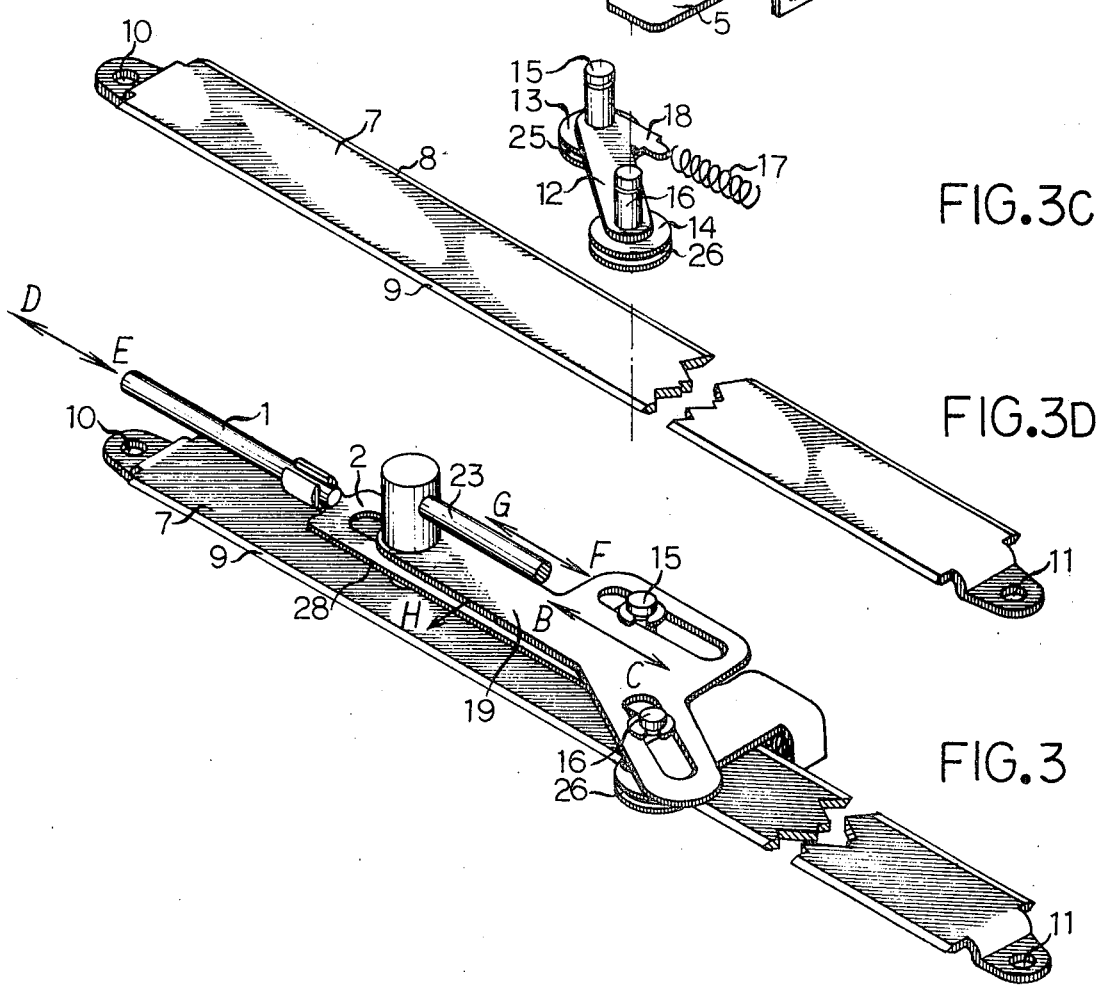
FIG.3C
FIG.3D
FIG.3

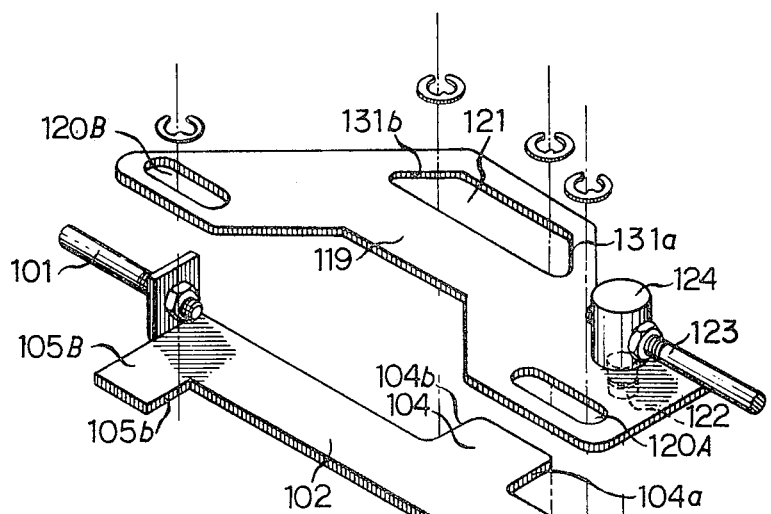
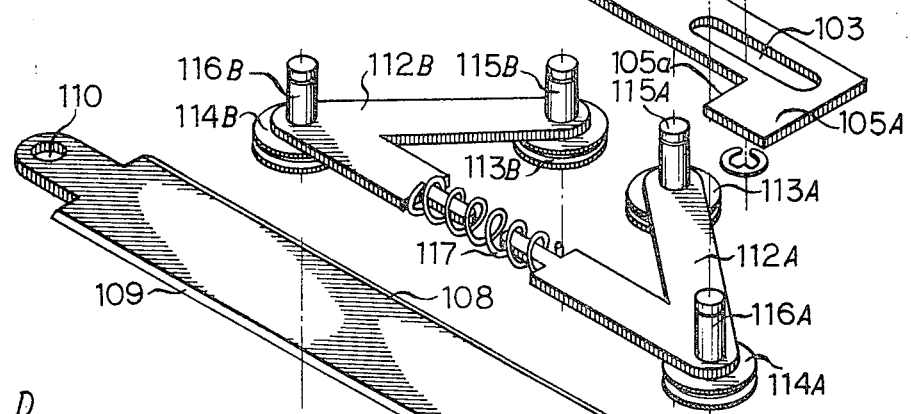
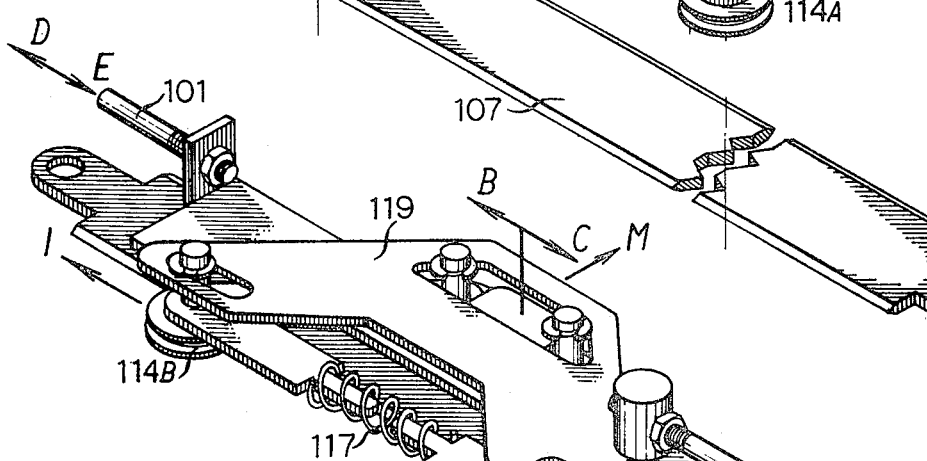
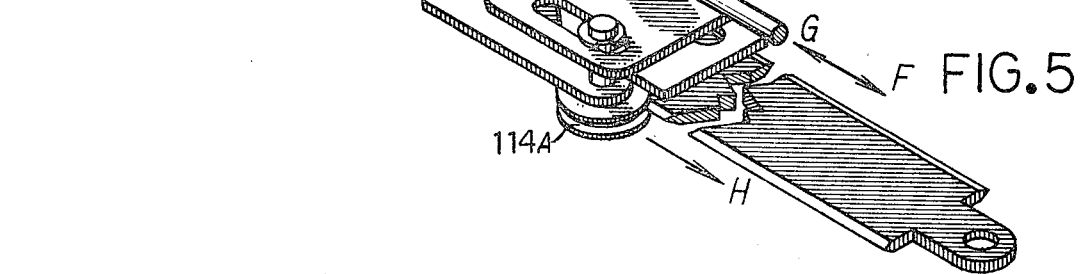

LOCKING DEVICE

BACKGROUND OF THE INVENTION

This invention relates to a novel locking device, and more particularly to a locking device adapted to enable to lock a driven member automatically at any position against a force applied thereon and yet to operate the driven member freely in accordance with motion of the drive member.

Hitherto, locking devices of this kind are broadly utilized in many industrial mechanisms such as in remote control mechanism of marine engine, side brake mechanism of automobiles and shutter mechanism, when it comes to necessitate to operate the driven member freely in accordance with motion of the drive member, and conversely to lock the driven member automatically at any position against continuous or occasional forces applied thereon without any influence upon the drive member. Furthermore, in the industrial mechanisms it sometimes becomes necessary to lock the driven shaft automatically against each of two opposite directional forces applied thereon. For example, with respect to the locking device used in the shutter mechanism, the locking device is not only to support it against the continuous force due to door weight, but also advantageously to support it against a manual force which might apply occasionally in opposite direction to said gravitative force to prevent the shutter from being opened without using key, or the like.

There are many other cases in which the direction of forces is altered occasionally or interchangeably.

A previous locking device, comprising pawls or clicks equipped on a driven shaft and a fixed locking member having many teeth which engage with the pawls, is lacking in the ability to lock the driven member at desired positions because the meshing between the pawls and the teeth are held at only some predetermined teeth positions. Besides, in such locking device, additional members are necessary to release the engagement to operate the driven member in accordance with motion of the drive member.

As for the locking device which locks the driven shaft automatically against each of two opposite directional forces applied thereon, a previous locking device which comprises a fixed sliding plate which is circular arc in shape, two locking members which have two locking elements respectively, which are pressed by resilient members in contrary gradient each other, a lever which makes the locking member slide along the sliding plate circularly, and a driven shaft which is connected to an arm member formed in other side of the lever, has a limited stroke length unavoidably because the sliding plate is circuler arc in shape. An uneven or chordal motion of the driven shaft due to circular motion of the arm member is another unavoidable withdrawback of such locking device.

OBJECTS OF THE INVENTION

An object of the present invention is to provide a locking device which enables to lock the driven member automatically at any position on the locking plate without being restricted to some predetermined positions.

Another object of the invention is to provide a locking device which enables to move the driven member and the driven member lineally and uniformly.

Further object of the invention is to provide a locking device which enables to release the locking engagement between the driven member and fixed member without utilizing any other parts therefor.

Furthermore object of the invention is to provide a locking device which enables to lock the driven member automatically even against each of two opposite directional forces applied thereon.

Still further object of the invention is to provide a locking device which has an arbitrary stroke length.

Other objects and advantages of the invention will become apparent from the following description and the accompanying drawings.

BRIEF DESCRIPTION OF THE DRAWINGS

FIGS. 1, 2 and 3 illustrate an embodiment of the present invention.

FIG. 1 is an elevational view showing the general idea of the whole structure of this embodiment.

FIG. 2 is a schematic sectional view along the line A—A of FIG. 1.

FIG. 3 is perspective views showing structual parts and an assembling of this embodiment.

FIGS. 3A, 3B, 3C and 3D are showing an operating plate with a driven shaft, a drive plate with a drive shaft, a locking member and a coil spring, and a locking plate, respectively, and further showing the relative positions of each part in chain line.

FIG. 4 and FIG. 5 illustrate an another embodiment of the present invention.

FIG. 4 is an elevational view showing the general idea of the whole structure of this embodiment.

FIG. 5 is perspective views showing structual parts and an assembling of this embodiment.

FIGS. 5A, 5B, 5C and 5D are showing an operating plate with a driven shaft, a drive plate with a drive shaft, a locking member and a coil spring, and a locking plate, respectively, and further showing the relative positions of each part in chain line.

DETAILED DESCRIPTION

It has been found that these objects can be achieved by a locking device comprising a fixed locking plate means, which has an arbitrary length and locking flanks on both sides thereof; a locking member means, being located inclining to the longitudinal axis of the locking plate means, provided with two contact members which define locking flanks with which the locking flanks of the locking plate means contact and two pins; a drive plate means which has contact sides, formed at about right angles to the longitudinal axis of the locking plate means, with which the pins contact, and is equipped with a drive shaft; an operating plate means which has a sliding flank, paralleled to the longitudinal axis of the locking plate means, along which one of the pins slides and another sliding flank, inclined to the above sliding flank, along which other of the pins slides and is equipped with a driven member; and a resilient means to press the contact members against the locking flanks of the locking plate means.

Figure 1:
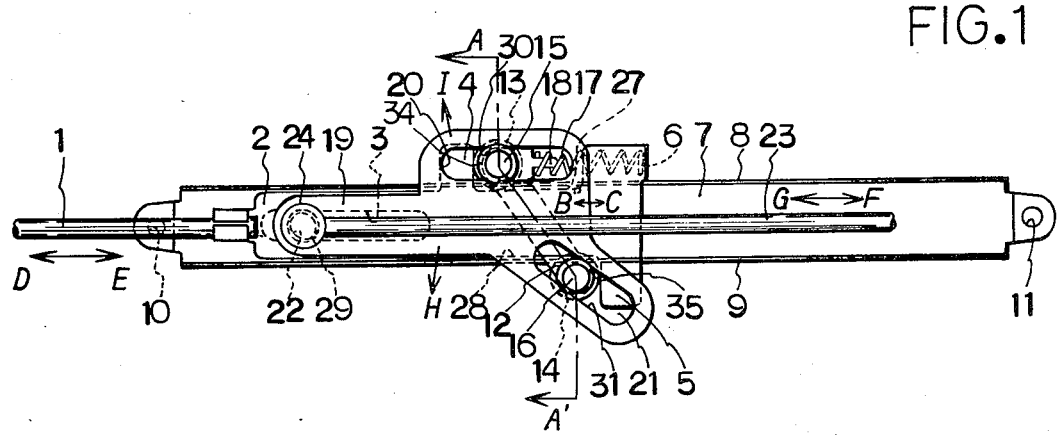
Figure 2:
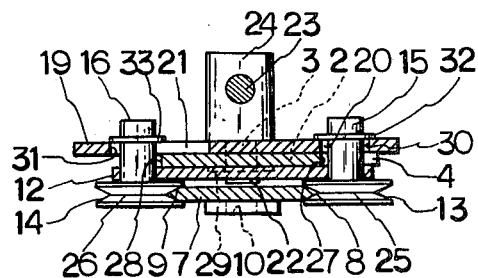

A preferred embodiment of the present invention will now be described by way of example only with reference to the accompanying drawings in which;

Referring to FIG. 1 and FIG. 3B, a drive shaft 1 is connected to the drive plate 2 which defines a hole 3, a projection 4 which has a contact side 4a formed at about right angles to the longitudinal axis of the locking plate, a projection 5 which has a similar side 5a and a spring receiver 6.

Referring to FIG. 3D, the locking plate 7, usually fixed, has an arbitrary length and locking flanks 8, 9 on both sides which are wedge in shape to accomplish a positive locking engagement and holes 10, 11 for fixing.

Referring to FIG. 3C, the locking member 12 has contact members 13, 14 at near end thereof which have locking flanks 25, 26 shapes of which are equivalent to those of the locking plate, pins 15, 16 generally mounted concentrically with the contact members and a spring receiver 18 placed at the pin 15 side to accept one end of the coil spring 17.

As shown in FIG. 1, the line connecting the centers of two contact members is inclined to the axis of the locking plate.

Referring to FIG. 3A, the operating plate 19, utilized for operating the locking member 12, has a prolonged hole 20 which defines a sliding flank 30 which is approximately parallel to the longitudinal axis of the locking plate, an another prolonged hole 21 which defines a sliding flank 31 which is inclined to the axis, above-described, and a driven shaft 23.

The locking member 12 is mounted on the locking plate 7. The contact members 13, 14 of the locking member come in contact with the locking plate at each locking flanks thereof. Two pins 15, 16 are passing by near the contact sides 4a 5a of projections 4, 5 and through the prolonged holes 20, 21 of the operating plate 19, and retained by suitable fasteners (shown by 32, 33 in FIG. 3) at upper ends thereof, respectively.

The guide pin 22 is passing through the sliding hole 3 and retained by a fastener 29. This construction using a pin and a sliding hole is effective to prevent it from side way motion thereof.

Referring to FIG. 1, FIG. 3B and FIG. 3C, a yieldable expantion spring 17 is interposed between the spring receiver 18 of the locking member 12 and the spring receiver 6 of the drive plate 2 for biasing the pin 15 in B direction.

There are slight clearances between projection 4 and the pin 15 as well as projection 5 and the pin 16, respectively.

In case a force is applied in F direction on the driven shaft 23, while the drive shaft 1 is free from any force, the contact member 14 is pressed by the inclined sliding flank 31 against the locking flank 9 of the locking plate 7. Accordingly, being rotated the operating plate slightly in the direction of H and being also pressed another contact member 13 against the locking flank 8, the operating plate 19 equipped with the driven shaft 23 is secured tightly to the locking plate 7.

In this situation, when the drive shaft is operated in E direction, pushing the contact side 4a the pin 15 in C direction, the inclined line connecting the centers of two contact members is slightly rotated to the direction at right angles to the longitudinal axis of the locking plate. Consequently, being released the locking engagement between contact members 13, 14 and the locking plate 7, the driven shaft is allowed to move in F direction.

In case the drive shaft 1 is operated in D direction, while a force is being applied in F direction, the pin 16 is pushed in B direction by the contact side 5a of projection 5, being released the locking engagement between the contact members 13, 14 and the locking plate 7, the driven shaft is enabled to move in G direction. In addition, ceasing this operation of the drive shaft at desired position, the driven shaft is automatically and immediately locked to the locking plate by means of the inclined sliding flank 31 of the operating plate 19 which is being pushed by the force applied on the driven shaft in F direction.

Figure 4:
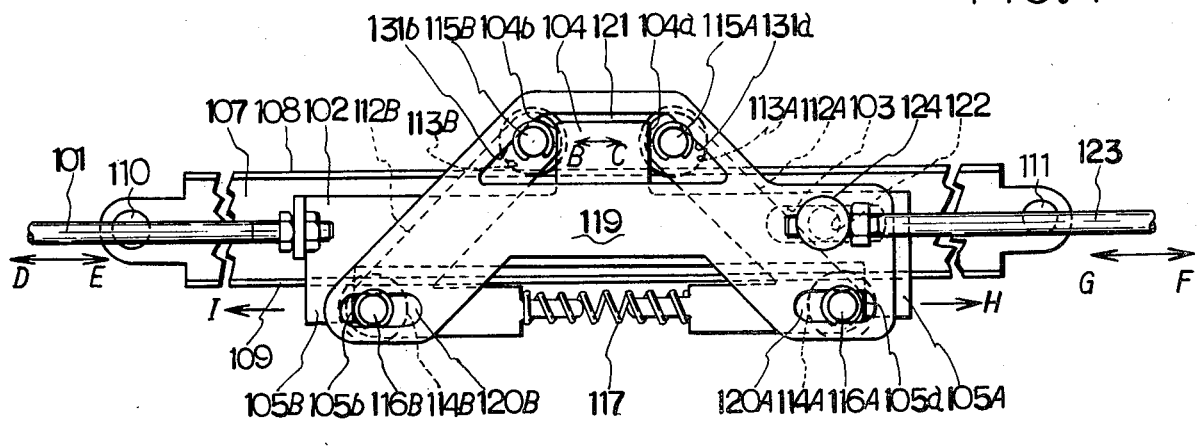

FIG. 4 and FIG. 5 illustrate a modified embodiment of the invention in which the locking device with two locking members enables to lock a driven shaft automatically against each of two opposite directional forces applied thereon.

A locking plate 107 (shown in FIG. 4 and FIG. 5D), normally fixed, has an arbitrary stroke length and paralleled locking flanks on both sides thereof.

A drive plate 102 (shown in FIG. 4 and FIG. 5C) located on the locking plate and equipped with a drive shaft has a projection 104 defining two contact sides 104a, 104b formed at about right angles to a longitudinal axis of the locking plate 107, another projections 105A, 105B defining similar contact sides 105a, 105b respectively and a prolonged hole 103.

An operating plate 119 (shown in FIG. 4 and FIG. 5A), mounted on the drive plate 102, has a hole 121 which defines two inclined sliding flanks 131a, 131b at the side of projection 104 of the driven plate 102, prolonged holes 120A, 120B at the side of the projections 105A, 105B parallel to the longitudinal axis of the locking plate, a guide pin 122 which is inserted in the prolonged hole 103 slidably and retained by some suitable fastener at the near end thereof and a carrier 124 equipped with a driven shaft 123.

Two locking members 112A, 112B (shown in FIG. 4 and FIG. 5C), placed between the driven plate and the locking plate 107, are inclined contrarily to each other and to the longitudinal axis of the locking plate 107. Contact members 113A, 114A and 113B, 114B equipped in the locking members respectively are in contact with the locking flanks 108, 109 of the locking plate 107.

A spring 117 is interposed between the two contact members 114A, 114B for biasing the contact members against the locking flanks of the locking plate.

The contact member 113A has a pin 115A, usually mounted concentrically therewith, extended to contact with the contact side 104a of the drive plate 102 and inclined sliding flank 131a of the operating plate 119. The contact member 113B has a pin 115B which is extended to contact with the contact side 104b of the drive plate 102 and inclined sliding flank 131b of the operating plate 119. The contact member 114A has a pin 116A which is extended to contact with the contact side 105a of the drive plate 102 and to be inserted in the prolonged hole 120A of the operating plate 119 slidably. The contact member 114B has a pin 116B which is extended to contact with the contact side 105a of the drive plate and to be inserted in the prolonged hole 120B of the operating plate 119 slidably.

In case any axial force is not applied neither on the drive shaft nor on the driven shaft, being moved the contact member 114A due to the spring forces 117 in H direction and being moved the contact member 114B in I direction, the contact members 113A, 113B are pressed against the locking flank 108 by means of the inclined sliding flanks 131a, 131b. Thus, being pushed out the operating plate in M direction, the prolonged holes 120A, 120B press the contact members 114A, 114B against the locking flank 109 respectively. Hence, the driven shaft 101 and drive shaft 123 are remained still at the instant place. In case no force applies, the drive shaft can be moved in D direction freely because the locking engagement between the locking plate and the locking members is released by means of the contact side 104*b* which pushes the pin 115B in B direction and the contact side 105*a* which pushes the pin 116A in B direction.

In case a force in F direction applies on the driven shaft 123, the operating plate with the driven shaft 123 is locked at the instant position because the inclined sliding flank 131*b* presses the contact member 113B against the locking flank 108 and the contact member 114B, as described above, is pressed against the locking flank 109 owing to the linear axial sliding motion of the operating plate by means of the combination of the pin 122 equipped in the operating plate and the prolonged hole 103 in which the pin 122 slides.

In contrary case a force in G direction applies on the driven shaft 123, the operating plate with the driven shaft 123 is also locked at the instant position because the inclined sliding flank 131*a* presses the contact member 113A against the locking flank 108 and the contact member 114A, as described above, is pressed against the locking flank 109 owing to the linear axial sliding motion in B direction of the operating plate 119 relative to the drive plate 102.

Thus, the driven shaft can be moved freely in accordance with the push/pull operation of the drive shaft, and ceasing the operation it is locked because either of two locking members is pressed against locking flanks of the locking plate by push/pull force applied thereon. The embodiment described above enables to lock the driven member automatically against either of two opposite directional forces applied thereon.

Referring especially to FIG. 3A and FIG. 5A, sliding flanks 30, 31 and 131*a*, 131*b* are illustrated and explained as portions of prolonged holes. However, the holes may be of suitable forms which can define proper sliding flanks including shapes of square and concavity (not shown).

Referring to FIG. 1 and FIG. 3D, a locking plate which has locking flanks slightly inclined each other may be utilized to obtain a harder locking engagement.

The locking flanks of the locking plate and locking members may be wedge in shape advantageously to accomplish a positive engagement between the locking plate and the locking members as shown in FIG. 3C, FIG. 3D, FIG. 5C and FIG. 5D. However, they may be of suitable surfaces in shape including simple plain.

To ensure the positive engagement and to get rid of an impediment owing to the rocking motion which may occur in the driven shaft, the locking plate may be mounted advantageously on suitable basis (not shown) permitting simultaneous rocking motion therewith.

Wire or the like which can support push and pull forces may be adapted as a drive or driven shaft member as well as ordinary steel shafts.

Referring to FIG. 3 and FIG. 5, an assembling may be rearranged in which, for example, the locking member may be located between the operating plate and the drive plate.

In case the locking plate has parallel locking flanks, it is to be noticed that an arbitrary stroke length is adaptable because the locking plate may be freely designed in length.

Although the construction using a guide pin and a sliding hole is utilized to prevent from side way motion in these embodiments, some another means may be also used. Means with piercing holes, fixed leaving this locking device, through which the drive shaft and driven shaft pass is also used for this purpose (not shown).

As already described, it is quite convenient to incorporate this locking device of the present invention into some mechanisms, because this locking device is in small-sized owing to thin and small parts thereof.

As many apparently widely different embodiments of this invention may be made without departing from the spirit and scope thereof, it is to be understood that the invention is not limited to the specific embodiments thereof except as defined in the appended claims.

What we claimed is:

1. A locking device comprising:
    a fixed locking plate means which has an arbitrary length and locking flanks on both sides thereof,
    a locking member means, being located inclining to the longitudinal axis of said locking plate means, provided with two contact members which define locking flanks with which said locking flanks of said locking plate means contact and two pins secured to said locking member means,
    a drive plate means which has contact sides formed at about right angles to the longitudinal axis of said locking plate means, with which said pins contact, and a drive shaft connected to said drive plate means,
    an operating plate means which has a sliding flank, parallel to said longitudinal axis of said locking plate, along which one of said pins of said locking member slides and another sliding flank, inclined to said first mentioned sliding flank, along which the other of said pins of said locking member means slides, and a driven shaft connected to said operating plate, and
    a resilient means to press said contact members against said locking flanks of said locking plate means.

2. A locking device as claimed in claim 1, wherein said locking plate means has paralleled locking flanks.

3. A locking device as claimed in claim 2, wherein said locking member means consists of two locking members, being located inclining contrarily to each other and to the longitudinal axis of said locking plate means, provided with two contact members respectively which define locking flanks with which said locking flanks of said locking plate means contact and two pins secured to each locking member; said drive plate means has four contact sides formed at about right angles to said longitudinal axis of said locking plate means, with which said pins of said locking member means contact; and said operating plate means has two sliding flanks, paralleled to said longitudinal axis of said locking plate means, with which two of said pins of said locking member means contact and another two sliding flanks, inclined contrarily to each other and to said longitudinal axis of said locking plate means, with which others of said pins contact.

4. A locking device as claimed in claim 1, wherein said locking member means consists of one locking member.

5. A locking device as claimed in claim 4, wherein said locking plate means has locking flanks slightly inclined to each other.

6. A locking device as claimed in claim 1, wherein said locking flanks of said locking member means and said locking plate means are wedge in shape.

7. A locking device as claimed in claim 1, wherein said operating plate means has a guide pin and said drive plate means has a sliding hole in which said guide pin is inserted slidably.

* * * * *